June 19, 1928.
J. O'BRIEN
1,673,990
AXLE SUPPORT
Filed Nov. 17, 1924
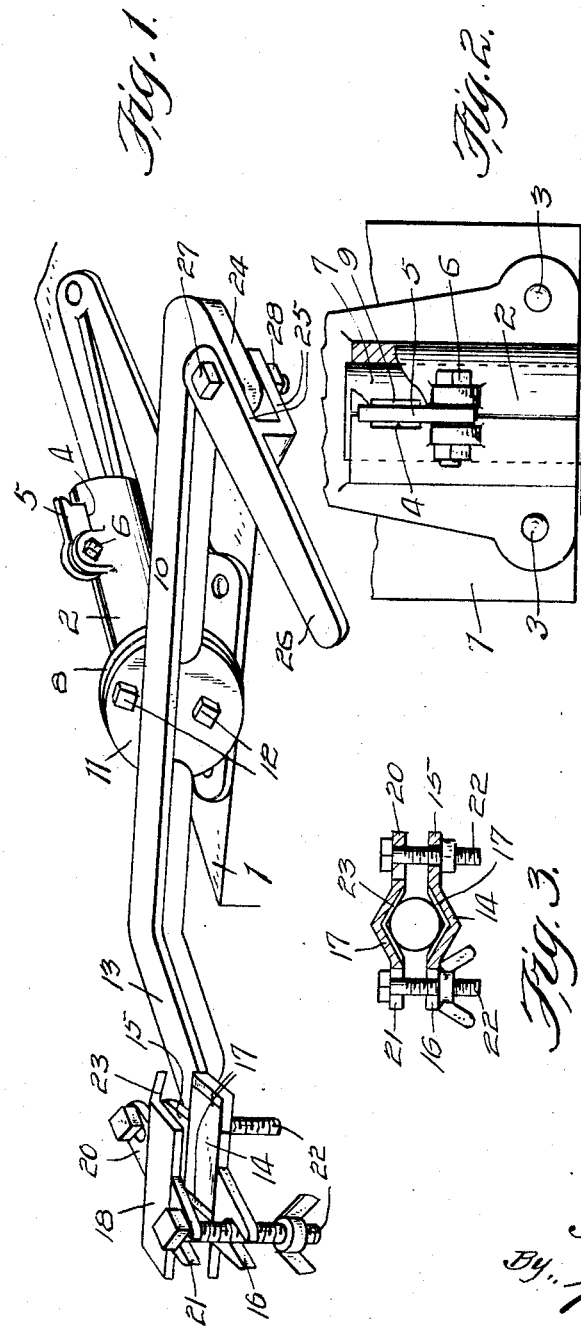
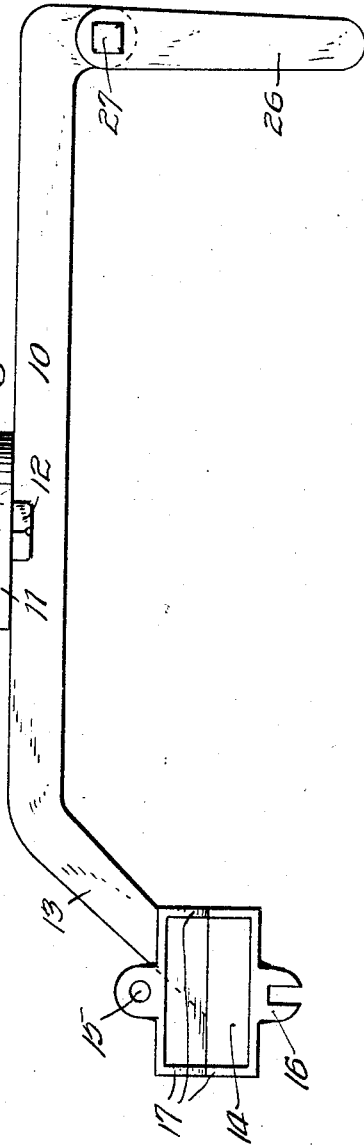
Inventor:
Joseph O'Brien.
By Fred'k J. Harriman
Attorney.

Patented June 19, 1928.

1,673,990

UNITED STATES PATENT OFFICE.

JOSEPH O'BRIEN, OF MAPLEWOOD, MISSOURI, ASSIGNOR TO ALLEN E. BOSLEY, OF ST. LOUIS, MISSOURI.

AXLE SUPPORT.

Application filed November 17, 1924. Serial No. 750,486.

My invention relates to axle supports and more particularly to a support to which the rear axle of a motor vehicle can be clamped while working on the same, such as repair work, although not necessarily limited thereto, and also not limited to the supporting of axles alone as other machine elements can be efficiently supported thereby, and, the invention is a distinct and practical improvement designed to overcome certain practical objections to, and defects in, axle stands now in use.

The object of my present invention is to provide an axle support that can be attached to a bench, stand, or post in a shop and capable of swinging or rotative movement due to pivotal connection with a socket support.

A further object of the invention is to provide an axle support having a substantial L-shaped member for pivotal connection with a socket member, the short arm of which is provided with a two-piece clamp jaw and the free end of the long arm thereof being provided with a pivotally supported rest arm.

A still further object of the invention is the provision of an axle support which can be moved to a perpendicular position, any intermediate position and to a horizontal position, in which latter position the support can be locked so that the machine element clamped thereto and supported thereby can be worked upon by a mechanic at a convenient height and position.

A still further object of the invention is to provide an axle support which is comparatively simple and inexpensive in construction, strong, durable, easily and quickly manipulated and which is highly efficient for the purpose designed.

With the above and other objects in view, as will be apparent hereinafter, the invention consists in the novel features of construction, arrangement and combination of parts hereinafter more fully described and finally pointed out in the claims hereto appended.

Referring to the accompanying drawings forming a part of this specification, wherein like characters of reference denote similar parts throughout the several views:

Fig. 1, is a view in perspective of an axle support constructed in accordance with my invention.

Fig. 2, is a top plan view thereof.

Fig. 3, is a sectional view of the clamp.

Referring to the drawings, the reference character 1 represents a suitable bench, stand or post of any desired height to which a suitable longitudinally split socket member 2 is fixed by means of suitable fastening devices 3. The socket member is horizontally disposed and is provided with a slotted opening 4 and lock key 5 which is preferably, although not necessarily, pivotally connected, as at 6, to the socket member adjacent the slotted opening 4.

Rotatably mounted, or journaled within the socket member 1 is a tubular supporting arm 7 having a flange 8 formed at one end thereof and provided near its opposite end with a peripheral slotted opening 9 adapted to be brought into register with the slotted opening 4 of the socket member 1 when moved into its normal position so that the key 5 will engage therein to hold the arm from rotative movement.

A suitable supporting member 10, preferably T-shaped in cross section, is provided with an integral plate section 11. The plate section 11 is fixed to the flange 8 of the tubular arm 7 by means of a plurality of suitable fastening devices 12. One end of the supporting member 10 is disposed at a suitable angle to the remainder of the member to provide a short forwardly and outwardly directed arm extension 13. The free end of the short arm extension 13 is provided with a suitable integral stationary V-shaped clamp jaw section 14 provided with the perforated ear 15 and the opposed slotted ear 16. The stationary jaw section 14 is preferably, although not necessarily, provided with the raised end marginal borders 17 so as to provide a two joint contact with any machine element supported thereby.

The reference numeral 18 represents a removable V-shaped clamp member 19 which is provided with two opposed slotted ears 20 and 21 to normally engage the ears 15 and 16, respectively of the stationary jaw member 14 when there is no machine element clamped between the two jaw members. It will be here observed that the longitudinal axis of the clamping jaw members runs parallel with the supporting member 10 and at right angles to the supporting arm 7, which is rearwardly directed from supporting member 10. Suitable bolts 22 are employed and receivable in the jaw opening and slots for clamping any desired object or machine element, such for instance as a rear axle, or other device between the jaw members 14 and 18. The upper movable jaw member 18 is also preferably provided with raised end marginal borders which are designated 23 and which register with the raised end marginal borders 17 of the lower clamp member 14 when the two members are clamped together, as is manifest.

The opposite end of the supporting member 10 from the clamp members, is provided with a forwardly directed perforated ear 24 to which is connected the bifurcated end 25 of a suitable rest arm 26 by means of a suitable headed bolt 27 provided with a securing nut 28. The upper plane of the rest arm 26 is in substantial alignment with the apex of the V-shaped raised and marginal faces 17 of the stationary or lower clamp member 14 so that the axle or any other machine element clamped between the jaw members 14 and 18 can also rest on the rest arm, thus requiring but one jaw clamp to rigidly support an axle or other element to be worked upon by a mechanic.

It will be apparent from the foregoing specification and drawings that the support is rigidly and securely held in its horizontal position by means of the key 5 and that by raising the key 5 the supporting arm 10 can be moved to a perpendicular position for whatever reason desired, such for instance, as positioning an axle or other machine element between the jaw clamp and then be swung into a raised horizontal position or any angular position where it can be conveniently worked upon.

By having the rest arm 26 pivotally connected to the supporting member 10 by means of the fastening device 27 and securing nut 25, it is evident that the rest arm 26 can be locked in any desired position so that it will not be displaced when the supporting member 10 is moved into a perpendicular position.

The many advantages of the herein described invention will readily suggest themselves to those skilled in the art to which it appertains.

I do not wish to be understood as having limited myself to the exact details of construction shown and described, but desire to have it understood that the invention I have shown in the drawings is merely illustrative, as it is manifest that various minor changes may be made in the exact construction and particular arrangement of parts without departing from the spirit of my invention, hence I reserve the right to make any such changes, or modifications as may fairly fall within the scope of the appended claims when fairly construed.

What I claim is:

1. In an axle supporting structure, a socket member, a tubular shaft carried by said socket member, a supporting member fixed to and disposed in advance of and at right angle to said shaft, a jaw clamp including a stationary member and a movable member associated with one end of said supporting member and in advance thereof and a pivotally connected rest-arm carried by the opposite end of said supporting member.

2. In an axle support, a stationary socket member, a tubular shaft rotatably carried by said socket member, a flange for said shaft, means to lock said shaft against rotation, a supporting member, a plate fixed to said supporting member, means for fastening said plate to said flange, an arm extension directed from one end of said supporting member at an obtuse angle thereto, a two piece jaw clamp carried by the free end of said arm extension, an ear directed from the opposite end of said supporting member, a rest arm pivotally connected to said ear and means for locking said rest-arm against displacement in any desired adjusted position of the supporting member.

3. In an axle support, in combination, a fixed socket member having a peripheral opening, a shaft journaled within said socket member having a peripheral opening, a key receivable in said openings when in register for locking the shaft against rotation, a supporting member having an angularly directed arm extension, a clamping device associated with the free end of said arm extension and a pivotally connected rest-arm associated with the opposite end of said supporting member.

4. A motor vehicle rear axle support comprising a support, a supporting member associated with said support, said supporting member having one end directed forwardly at an acute angle, a lower clamp jaw associated with the forwardly directed end of the supporting member, an upper clamp jaw removably associated with said lower clamp jaw for accommodating one end of a rear axle housing therebetween and an arm-rest pivotally connected to the opposite end of the supporting member upon which the opposite end of the axle housing can rest while disconnecting the housing and which rest can swing to a reverse position to permit the removal of one end of the housing from the other end thereof.

5. In a device of the class described, a longitudinally split socket member adapted to be fixed to a support, a tubular supporting arm rotatably mounted in the socket member, means to prevent rotation of said tubular supporting arm, there being a flange at one end of said tubular supporting arm, a supporting member, a plate fixed to the supporting member intermediate the ends thereof, said plate being fixed to said flange, an arm extension directed forwardly and outwardly from one end of said supporting member, a stationary V-shaped jaw member carried by the free end of said arm extension, there being a perforated ear and a slotted ear carried by said jaw member, a removable V-shaped clamp member, there being a perforated ear and a slotted ear carried by said clamp member, fastening members connecting the ears of said jaw and clamp members, an ear directed forwardly from the opposite end of said supporting member, a rest arm having a bifurcated inner end for receiving the ear of said supporting member and a pivot pin for connecting the bifurcated end of the rest arm to the ear of said supporting member.

In testimony whereof, I have hereunto signed my name to this specification.

JOSEPH OBRIEN.